United States Patent [19]

Schnipke

[11] Patent Number: 4,854,344

[45] Date of Patent: Aug. 8, 1989

[54] SLOW-CLOSE APPARATUS FOR MINIMIZING WATER HAMMER AND/OR SHOCK WAVES RESULTING FROM CLOSURE OF VALVE MEANS

[75] Inventor: Dennis E. Schnipke, Wooster, Ohio

[73] Assignee: Premier Industrial Corporation, Cleveland, Ohio

[21] Appl. No.: 108,150

[22] Filed: Oct. 14, 1987

[51] Int. Cl.[4] .............................................. F16K 47/02
[52] U.S. Cl. ..................................... 137/606; 137/883; 188/306; 251/54
[58] Field of Search ...................... 251/48, 54, 292, 59; 137/514, 514.5; 188/306, 307

[56] References Cited

U.S. PATENT DOCUMENTS

| | | | |
|---|---|---|---|
| 1,077,502 | 11/1913 | Anderson | 137/514 |
| 1,171,169 | 2/1916 | Carter | 188/307 |
| 1,260,761 | 3/1918 | Donahoo | 188/307 |
| 2,078,231 | 4/1937 | Brisbane | 251/59 X |
| 2,790,520 | 4/1957 | Kuhn | 188/307 |
| 2,832,563 | 4/1958 | Walsh | 251/292 X |
| 3,422,843 | 1/1969 | Blackman et al. | 251/48 |
| 3,688,645 | 9/1972 | Reaves | 251/59 |
| 4,286,621 | 9/1981 | Glahn | 137/514 |

Primary Examiner—Stephen Hepperle
Attorney, Agent, or Firm—Jones, Day, Reavis & Pogue

[57] ABSTRACT

Apparatus for minimizing water hammer and/or shock waves resulting from closure of a valve member disposed for movement into and out of closing arrangement in valve means included within a fluid flow system. The apparatus comprises a piston and cylinder arrangement having a circular path of travel, the cylinder being formed in part as an incised channel means in a body means, within which body means a rotatable sleeve means is disposed in a longitudinal bore. The inner portion of the cylinder is the outer surface of the rotatable sleeve, and a fluid chamber is formed by said combination. The piston means projects outwardly from the sleeve and is disposed within the channel means, so that the piston means sweeps the cylinder volume as the sleeve is rotated. An adjustable orifice is provided in the cylinder means to constrict the flow of fluid in said cylinder on rotation of the sleeve. A fluid is supplied to the piston and cylinder arrangement, and the valve member is connected with said sleeve such that displacement of the valve results rotational movement of the sleeve, which is resisted by the fluid and orifice means.

15 Claims, 5 Drawing Sheets

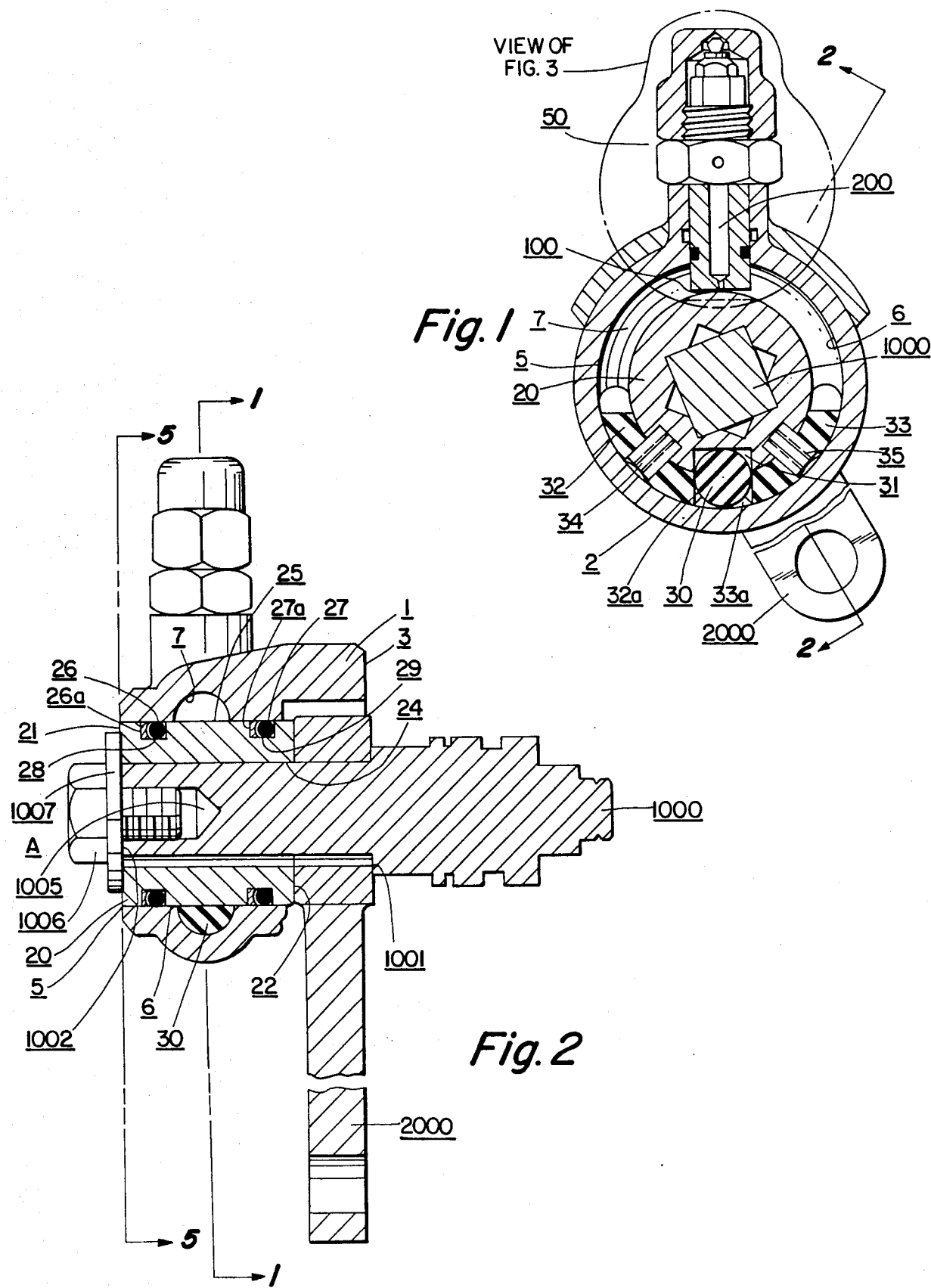

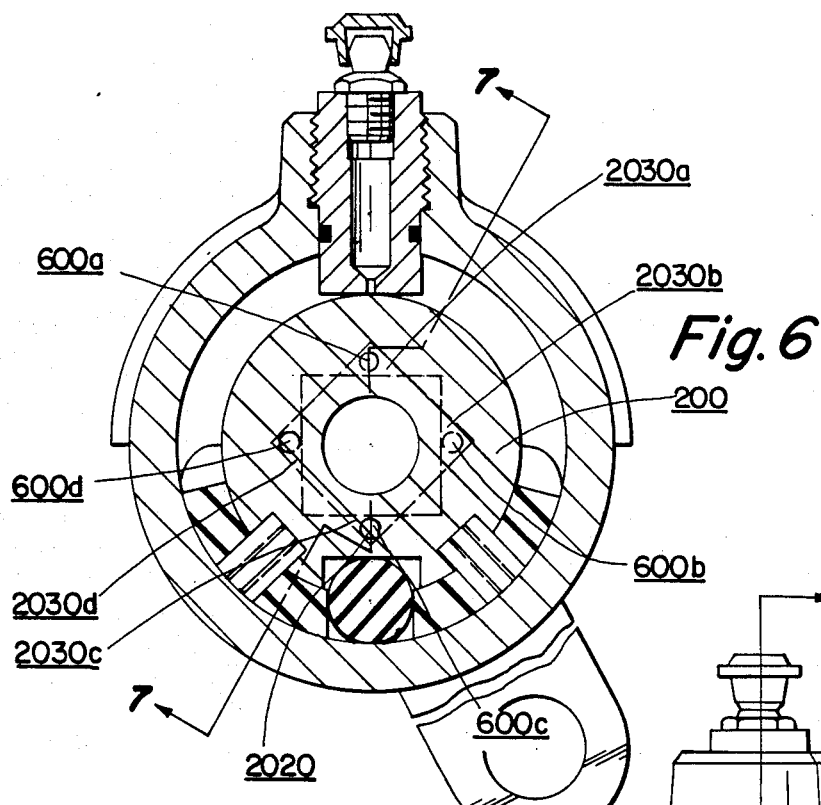
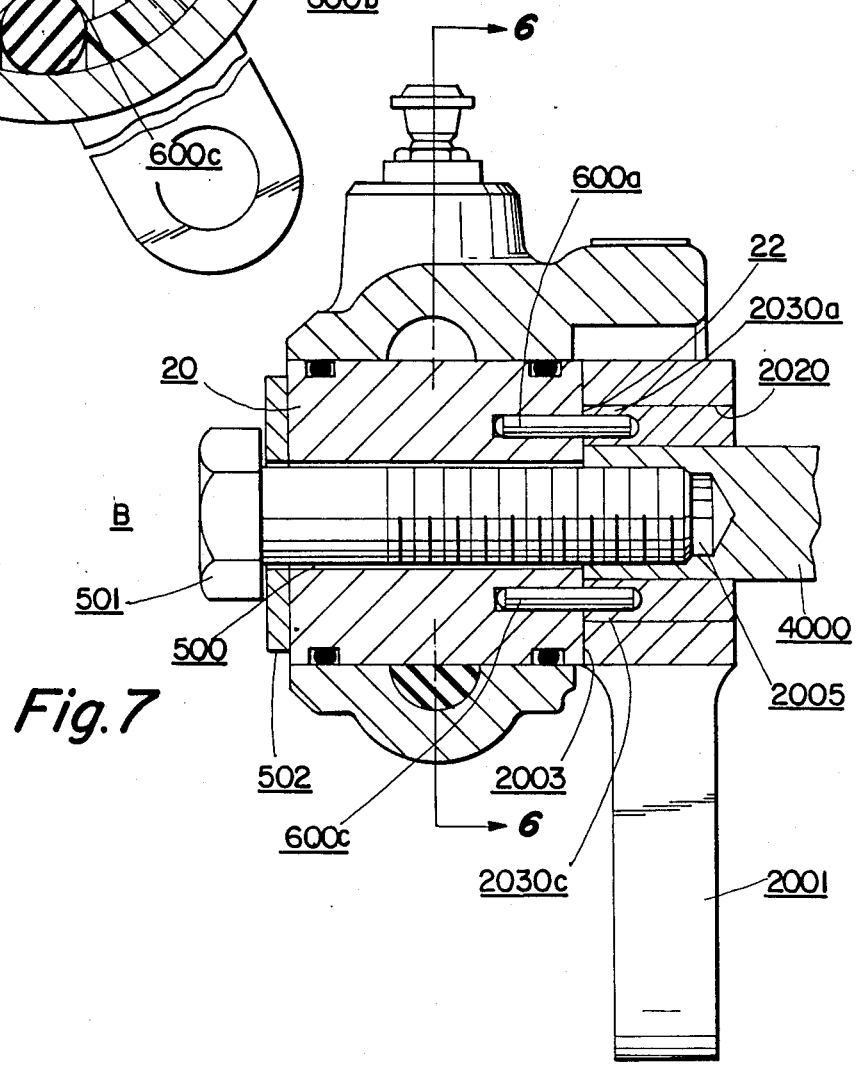

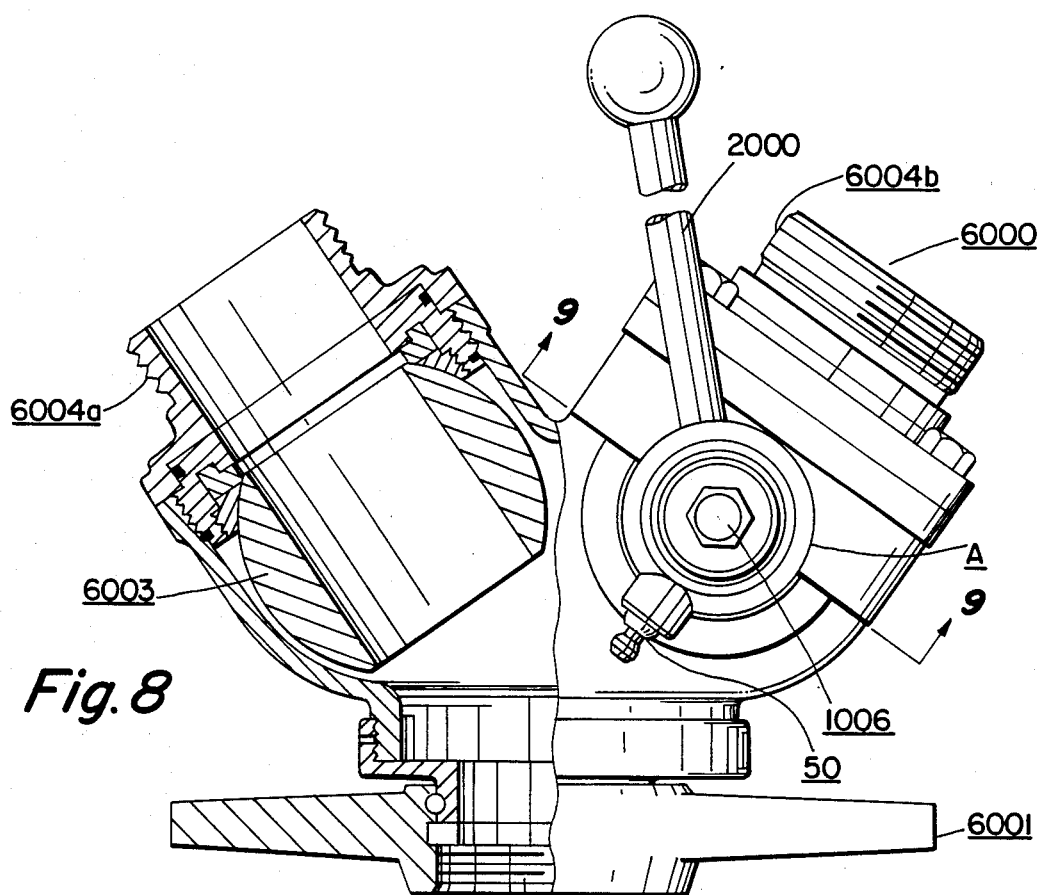
Fig. 8
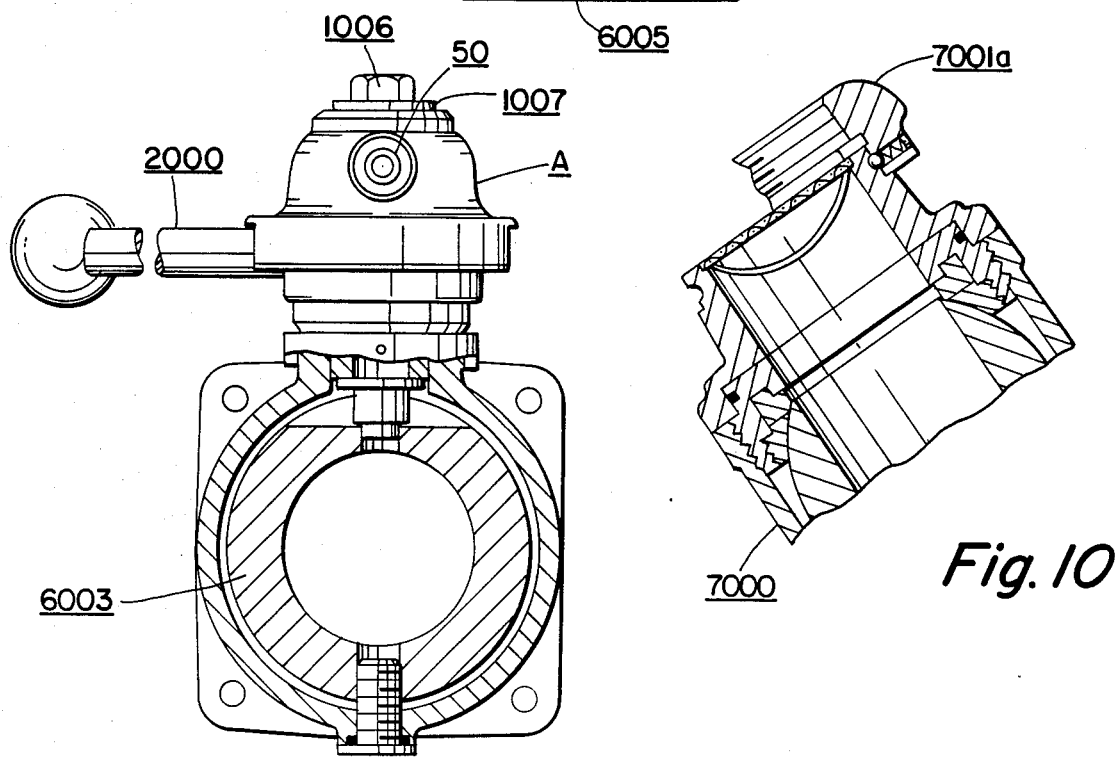
Fig. 9
Fig. 10

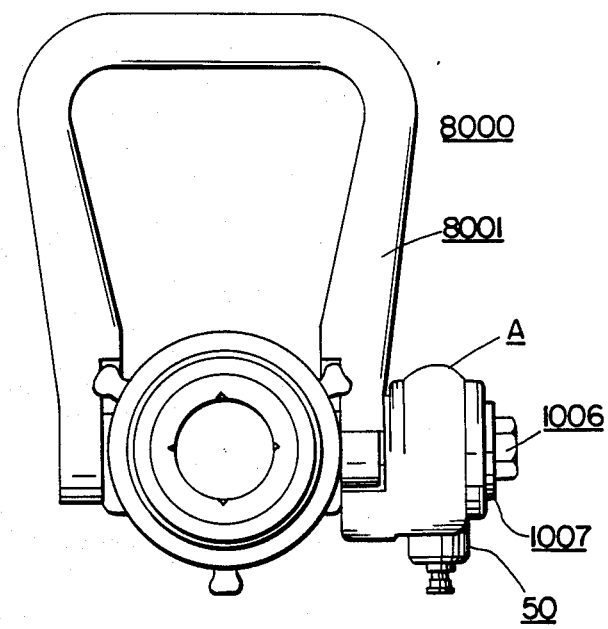
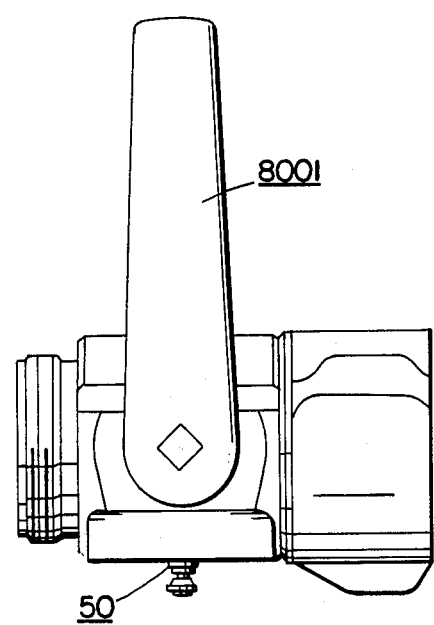
*Fig. 11*          *Fig. 12*
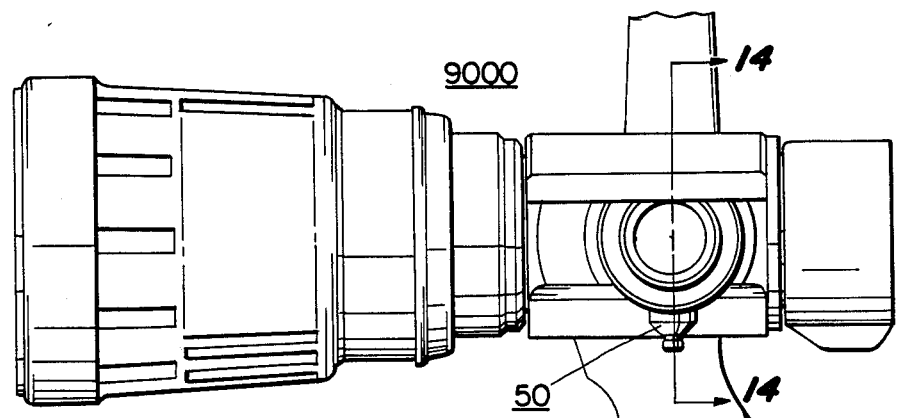
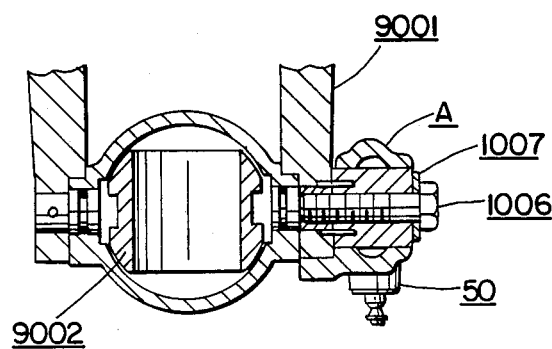
*Fig. 14*          *Fig. 13*

SLOW-CLOSE APPARATUS FOR MINIMIZING WATER HAMMER AND/OR SHOCK WAVES RESULTING FROM CLOSURE OF VALVE MEANS

BACKGROUND OF THE INVENTION

1. Field of the Invention

The invention relates generally to devices for use with valve means included within a fluid flow system.

2. Disclosure of Related Art Including Information Disclosed Under 37 C.F.R. §1.97–1.99

A wide variety of fluid flow systems are known and used in commerce and industry. Many of those systems contain non-compressible fluids which flow through them. When the fluid flow system is an enclosed system, there is a need to prevent the flow of such a non-compressible fluid from being stopped rapidly, such as by the rapid closing of a valve or a similar device. Rapid valve closure often results in the generation of a shock wave, which manifests itself as "water hammer" and other related problems. In fact, the shock wave resulting from rapid valve close can produce a significant pressure surge which may exceed the design limit of one or more of the components comprised within the fluid flow system.

An example of the seriousness of this problem is that encountered in fire service systems, where water flows through system components ranging from pumps to valves to hoses of rubberized fabric or other composition to nozzles. If a valve in a fire service system is closed too rapidly, the shock wave may overwhelm the containment ability of system components, particularly the fire hose. A burst or partially pierced hose may result, which may throw the fire fighter off his feet or may pull free from his grasp, to whip or flail through the air, with resulting injury to that fire fighter, other nearby fire fighting personnel and/or bystanders. The high pressure under which water is pumped through a standard fire service system produces a water stream which itself, if freed from the hose or other system components in an unintended direction, can cause serious injury. Additionally, these shock waves or pressure surges can cause extensive damage to the main valving and/or pumps of a fire fighting vehicle, such as a pumper, which could disable the pumper without warning, stopping the flow of water to control a fire with the likely result of property loss and injury to human life and limb.

Many attempts have been made to control and/or prevent rapid valve closing and the resulting production of shock waves. The simplest method is merely to slowly close any valve comprised within a system in which a non-compressible fluid is flowing. In the heat of fighting a fire, when closing off a valve to prevent fluid flow in an unintended direction, remembering to close that valve slowly is usually not foremost in the mind of the individual interacting with the system.

Mechanical checks and protections to provide pressure relief if a shock wave is generated through too-rapid valve closing have been used to avoid the problem. Pressure relief means have long been the favored apparatus applied in these efforts, but the known pressure relief means are far too slow in their action. The shock wave will have already done its damage to the system by the time a pressure relief means senses the problem and releases the pressure. Pressure relief means also suffer from the inherent venting to the environment of the non-compressible fluid. If the fluid is water, that may not present an insurmountable problem, if proper drainage from the relief valve can be provided. If the fluid contains chemicals or is itself hostile to persons or the environment, pressure relief means are unacceptable and cannot be used.

The most popular mechanical checks and protections have tended to be those which somehow prevent too-rapid valve closing, while allowing the valve to be closed at a rate which will not produce a shock wave.

Blackman et al. U.S. Pat. No. 3,422,843 ("Blackman '843"), discloses a mechanism for swing type check valves, in which a fixed restraining or cushioning pressure is produced by the swinging closed of the valve to apply pressure to fluid in a chamber, thereby preventing the sudden impact of the valve with the valve seat. Swing valve 24 of the swinging disk type is supported on a swing arm 26, which has an enlarged, cylindrical end portion 28, whose axis is disposed at right angles to the direction of swinging movement of the valve. Within that end portion are diametrically opposed, inwardly extending vanes 30. A central shaft 34 extends longitudinally through part 28, and is connected to the valve casing 10. Shaft 34 bears diametrically opposed, inwardly extending vanes 36, which are in turn positioned within part 28 between vanes 30 thereof. The cylindrical part 28 is closed by bushings 38, with 0-rings 40, which, in cooperation with part 28 and shaft 34, forms an internal pressure chamber 42. Chamber 42 is divided into two sections by vanes 30, which are interconnected by restricted passageways 44, through which fluid may flow from one section past vanes 30 to the other, as the valve 24 swings closed. Each of vanes 36 comprise a bypass passageway 46 and a check valve 48, which closes that passageway against the flow of fluid during closing movement of swing valve 24 but which opens to allow free flow of fluid therethrough during opening movement of the valve.

Chamber 42 is filled with oil. As the valve moves to the open position, through the pressure of fluid flowing through inlet 12 and outlet 14 of the valve, the oil flows through passageways 46, providing little or no restraint to the opening of the valve. On back flow through the flow line, however, the back flow of oil in chamber 42 through passageways 46 is resisted by valves 48. The oil must flow through restricted passageways 44, thereby restraining the movement of the valve to prevent slamming on seat 18.

Blackman discloses as a critical portion of his device a cylindrical part 50, which is designed to prevent the rise of pressure in pressure chamber 42 from causing leakage or disruption of seals 40. Part 50 is attached to part 28 so as to extend laterally therefrom to form an auxiliary chamber 52, which is in communication with chamber 42. Piston 58 is movably disposed in chamber 52, and biased toward part 28 by a coil spring 66. When a high pressure is exerted on valve 24, which might damage seals 40, the pressure in chamber 42 causes piston 58 to move away from part 28, increasing the volume of the device so that the pressure does not exceed a predetermined maximum.

Unfortunately, the Blackman '843 device, as disclosed by the drawings, in particular FIG. 2, does not appear to be operative. From the relationship between fixed central shaft 34, valve swing arm 26, internal pressure chamber 42; longitudinal vanes 36 and vanes 30, the valve must be in the closed position in FIG. 2 (see col. 3, ll. 61–62). (It cannot rotate clockwise from that position, because longitudinal vanes 36 will almost immediately contact and be stopped by vanes 30). In the closed position, the chamber 42 is not connected to the pressure side of the fluid, indicating that the chamber does not do anything to relieve pressure at the end of the stroke, when the pressure would be highest.

The Blackman '843 device, even assuming its operability, has several severe shortcomings. The passage 46 / ball 48 check valves of Blackman '843 are one way only, such that the vane 30 / longitudinal vanes 36 system will provide restriction and hence protection in one direction only. The orifice or restriction provided by passageway 44 is fixed, such that no adjustment in pressure may be made without dismantling the unit, and removing and replacing a first central shaft 34 with a second shaft 34 having a differently sized/configured restrictive passageway.

Blackman '843's one way only resistance and lack of pressure/resistance adjustability is particularly disadvantageous in fluid flow systems used in fire service. Even if a Blackman '843 device could be adapted for use in a hose, the lack of resistance in valve opening leads to poor valve control practices which are both inefficient to fire fighting practices and potentially dangerous. The lack of ready pressure/resistance adjustability is a more serious lacking, particularly in a hose application, because various pump flow rates and pressures will render a fixed resistance either too great or, more often, too slight, defeating the intended ability to avoid shock wave and water hammer by failing to sufficiently slow valve closing. Too slow a valve close, in a fire hose application requires the firefighter to hold his physical position until flow ceases, for what may prove to be a period of time that exposes him to unacceptable danger and risk of injury. (Movement of a fire hose flowing water is extremely difficult and can in itself be quite dangerous).

Additionally, Blackman '843 is restricted in application to internal placement in a swing-type check valve configuration. A number of other valve constructions do not present any compatability with a Blackman '843 structure. The required internal placement of the Blackman '843 device, in particular view of the need to anchor central shaft 34 at opposite ends to a valve casing, such as casing 10, is a substantial drawback. Retrofitting of existing valves with a Blackman '843 device is impossible in view of the internal placement requirement.

The art, then, lacked apparatus capable of providing a controlled, slow close capability to valves in fluid flow systems requiring adjustability to the pressure/resistance presenting during valve closing. It also lacked apparatus presenting two way pressure/resistance to valve opening and valve closing, even without the desired adjustability of that resistance. Further, no such device of any structure was known which could be easily retrofitted to existing valves of a variety of structures. No apparatus or device offered the desired combination of these features: two way pressure/ resistance to valve opening and closing, ready adjustability of the magnitude of the pressure/resistance, and easy retrofitting capability to a variety of valve structures.

A long felt need in the art existed for apparatus which solved the problem of controlling water hammer and/or shock waves resulting from closure of valve means in a fluid flow system. As exemplified by the Blackman '843 device, no known apparatus had even one, let alone all, of the aforenoted optimal advantages and characteristics.

SUMMARY OF THE INVENTION

The apparatus of the invention provides the optimal combination of features missing from the devices heretofore available for minimizing water hammer and/or shock waves resulting from the closure of valve means in fluid flow systems. The apparatus of the invention comprises:

a. Body means, having oppositely disposed first and second outer faces, wherein a substantially cylindrical internal passage extends longitudinally therethrough and between said faces, at least a part of the surface of said internal passage comprising at least one channel means, disposed circumferentially along and within said surface, extending into said body below said surface, such that said channel means generally defines a path laterally disposed to the longitudinal axis of said substantially cylindrical passage;

b. sleeve means, having oppositely disposed first and second outer faces, rotatably disposed for rotation about its longitudinal axis within said substantially cylindrical internal passage in said body means, having an outer surface disposed towards and in bearing relationship with the surface of said internal passage, which outer surface in coaction with said channel means of said body defines a fluid chamber;

c. projecting means extending outwardly from said outer surface of said sleeve means, configured to fit substantially within and sealingly coact with said channel means in said internal passage of said body means, whereby said projecting means will sweep the volume of said channel means on rotation of said sleeve;

d. adjustable orifice means, adjustably disposed in said body to extend inwardly from the exterior of said body into said internal passage and into said channel means in said body, such that its distal end projects into said channel means, and arranged to adjustably coact with the outer surface of said sleeve means to form an orifice between the distal end of said orifice means and said outer surface;

e. valve connection means for effecting connection between said sleeve means and said valve means, whereby displacement of the valve in said valve means results from rotational movement of said sleeve means about its longitudinal axis; and f. means for effecting externally applied rotational movement to said sleeve means.

The apparatus of the invention minimizes the potentially dangerous production of water hammer and/or shock waves in valve means with a variety of configurations. It can readily be retrofitted externally to valve means with a variety of configurations, with very little or no required structural modification of the valve means. Adjustment to the magnitude of the pressure/resistance through external manipulation of the apparatus is easily made, and may be made repeatedly with no difficulty, with each adjustment "locked in" until a readjustment is required. Two way pressure/resistance is provided at any of the pressure resistance magnitudes selected, without variation of magnitude between a valve opening mode and a valve closing mode.

It is therefore an object of this invention to provide novel apparatus which controls closure of valve means in fluid flow systems in which pressure/resistance is provided upon both closure and opening of said valve means.

It is another object of this invention to provide novel apparatus which controls closure of valve means in fluid flow systems in which adjustable means are provided to enable the variation of the magnitude of pressure/resistance to closure, through manipulation of said adjustable means from a point external to said valve means.

It is still another object of this invention to provide novel apparatus which controls closure of valve means in fluid flow systems which may be retrofitted to a variety of valve means structures and configurations.

It is a further object of this invention to provide novel apparatus which controls closure of valve means in fluid flow systems which includes a combination of the above-noted features.

Other objects and advantages of this invention will become apparent upon reading the following detailed description and appended claims.

BRIEF DESCRIPTION OF THE DRAWING

FIG. 1 is a top cross sectional view of the first embodiment of the apparatus of the invention, taken along section line 1—1 of FIG. 2.

FIG. 2 is a partial side cross sectional view of the first embodiment of the apparatus of the invention, taken along section line 2—2 of FIG. 1.

FIG. 6 is a top cross sectional view of a second embodiment of the apparatus of the invention, taken along section line 6—6 of FIG. 7.

FIG. 7 is a partial side cross sectional view of the second embodiment of the apparatus of the invention taken along section line 7—7 of FIG. 6.

FIG. 8 is a partial side cross-sectional view of the apparatus of the invention in combination with a wye structure and ball shutoff valve.

FIG. 9 is a partial top cross-sectional view of the apparatus of the invention in combination with a wye structure and ball shutoff valve, taken along section line 9—9 of FIG. 8.

FIG. 10 is a cross-sectional side view of the end detail of a siamese structure otherwise duplicative of the remainder of the apparatus of the invention in combination with a wye structure and ball shutoff of FIG. 8.

FIG. 11 is an end view of a ball shutoff valve assembly comprising the apparatus of the invention.

FIG. 12 is a front view of a ball shutoff valve assembly comprising the apparatus of the invention.

FIG. 13 is a front view of a nozzle incorporating the apparatus of the invention in combination with a ball shutoff valve.

FIG. 14 is a partial side cross-sectional view of the nozzle incorporating the apparatus of the invention in combination with a ball shutoff valve taken along section line 14—14 of FIG. 13.

DESCRIPTION OF THE PREFERRED EMBODIMENT

Figure 3:
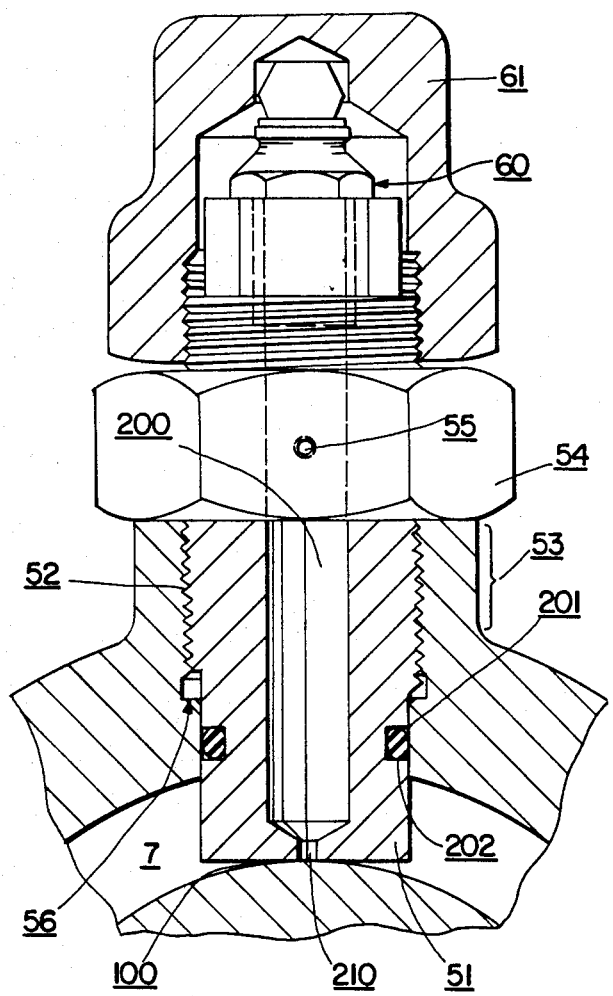
FIG. 3 is an expanded top cross sectional view of that portion of the first embodiment of the apparatus of the invention falling within the demarcation line in FIG. 1.

The preferred embodiments of the invention are most readily described by reference to the Figures, with a first preferred embodiment being illustrated in FIGS. 1–5, and a second preferred embodiment being illustrated in FIGS. 6–7. The apparatus of FIGS. 1–5 comprises an embodiment whose interconnection to the existing valve means is through extended valve stem means 1000 (FIG. 2), which is in turn connected through means (not illustrated) to the valve in said valve means which is disposed to close and open a fluid flow path through said valve means. This embodiment is readily adapted and applied for use with any device having a trunnion activated valve, such as a quarter turn valve, in which case said trunnion would comprise means 1000. Generally, the first embodiment of the invention is adaptable to butterfly valves and any other valve means that operate through the turning of a quarter turn valve to close and open a fluid flow path through said valve means.

The apparatus A indicated generally in FIGS. 1–2 consists of two main components, body means 1 and sleeve means 20. Body means 1 and sleeve means 20 may be fabricated from any material which is formable into the required shapes and structures, and which has the strength necessary to function in the environment in which the valve means is located. Metal, particularly brass, bronze and steel, and reinforced polymeric or other high strength polymeric materials are the preferred materials for fashioning these components.

Body means 1, as illustrated in FIGS. 1–5, is substantially cylindrical in shape, and has a first outer face 2 and a second outer face 3, oppositely disposed from each other, which face 3 is disposed towards the valve means whose closure is being controlled. A substantially cylindrical internal passage 5 extends between faces 2 and 3, which passage has a substantially cylindrical inner surface 6. Passage 5 is preferably formed by a boring operation followed by a machining operation to smooth the inner surface 6.

The inner surface 6 of internal passage 5 in body means 1 bears at least one channel means 7. Channel means 7 is disposed circumferentially along and within said surface of that passage such that it extends into body means 1 below said surface. The channel means 7 may display a number of variations in cross-sectional shape, including substantially square, rectangular, semi-elliptical and semi-circular, which a semi-circular cross section as illustrated in FIG. 2 being particularly preferred. A semi-circular cross section in channel means 7 produces a semi-toroidal shape to the channel. Channel means 7 may be formed in inner surface 6 by machining operations of the type known to those skilled in the valve means art. The centerline of channel means 7 is most preferably disposed perpendicularly to the longitudinal axis of substantially cylindrical internal passage 5, with the channel thus being laterally disposed from that axis by the distance of the radius of the passage 5.

Sleeve means 20 is configured to fit within and mate in a bearing relationship with the internal passage 5 of body means 1. Sleeve means 20 has a first face 21 and a second face 22, oppositely disposed from each other, which face 22 is disposed towards the valve means whose closure is being controlled. The sleeve means 20 is substantially cylindrical and is disposed within passage 5 in such a manner as to be rotatable about its longitudinal axis which coincides with the longitudinal axis of passage 5. The outer surface 25 of sleeve means 20 is in substantial contact/bearing relationship with inner surface 6 of passage 5. Preferably, the surfaces 6 and 25 of the passage 5 and sleeve means 20 are machined or formed to provide a clearance of 1.0 to 1.5 thousandths of an inch, which has been found sufficient to allow ready rotation of the sleeve means 20 within the passage 5 because the surfaces are in bearing contact with each other. A lubricant film may optionally be provided between those surfaces 6 and 25 to enhance the bearing relationship.

When sleeve means 20 is assembled within internal passage 5 of body means 1, outer surface 25 of said sleeve means coacts with channel means 7 to form and define a fluid chamber, whose boundary is the surface of channel means 7 and the oppositely disposed portion of outer surface 25 of the channel means 7. The amount of acceptable clearance between the surfaces 6 and 25 of the passage 5 and sleeve means 20 will in said fluid chamber. The less viscous the fluid in said chamber, the closer the clearance will be, to avoid unwanted leakage of said fluid. The clearance must remain sufficient, however, to allow ready rotation of the sleeve means 20 within the passage 5. The aforenoted clearance of 1.0 to 1.5 thousandths of an inch is appropriate where a material having the viscosity characteristics of a grease is used.

Surface 25 of sleeve means 20 is preferably provided with two sets of seals, 26, 27 which comprise O-ring seals. These seals 26, 27 are fitted into grooves 28, 29 respectively, which are formed within surface 25 of means 20. Seals 26, 27 are arranged to lie on opposite sides of channel means 7, and the fluid chamber which it defines in part, whereby any fluid present in such chamber is prevented from leaking along the surfaces 6/25. In a particularly preferred construction, additional back up rings 26a, 27a are provided with the O-rings 26, 27, to maximize the sealing isolation of channel means 20 and hence the fluid chamber which it defines with the oppositely disposed portion of surface 25.

The assembly of the body means 1 and sleeve means 20 into the relationship illustrated in FIG. 2 requires that a sequence of steps be carried out in inserting sleeve means 20 into internal passage 5 and rings 26, 27 into grooves 28, 29. In the initial step, means 20 is inserted into passage 5, with one of the grooves 29, extending out of said passage and beyond second face 3 of the body. O-ring 27, alone or with a back-up ring 27a, is inserted and fitted into said groove. During assembly, O-ring 27 is compressed and sleeve means 20 slid into passage 5 until the opposite groove, 28, extends out of said passage and beyond first face 2 of the body. O-ring 26, alone or with a back-up ring 26a, is then inserted and fitted into said groove. An appropriate tool is then used to compress O-ring 26 and sleeve means 20 is slid into passage 5 until its second face 22 is in approximate alignment with second face 3 of body 1.

The grooves 28, 29 must be sufficiently spaced from the center line of channel means 20 to prevent leakage of fluid into the grooves. Preferably where a fluid of grease-like viscosity characteristics is used in the fluid chamber, the grooves are at least one and one-half full multiple of their width away from the intersection of channel means 20 with the surface of internal passage 5. Where a fluid with thinner viscosity characteristics is used in the fluid chamber, a greater spacing of grooves 28, 29 from the inter-section of channel means 20 with the surface of internal passage 5 may be necessary.

Sleeve means 20 bears on its outer surface projecting means 30, which extends outwardly, preferably perpendicularly, from that surface. Projecting means 30 is configured to fit substantially within and sealingly coact with channel means 7. Projecting means 30 is mounted in a manner whereby it rotates along with any rotation of sleeve means 20 about its longitudinal axis. This in turn causes it to sweep through the volume defined by channel means 7 which partially defines the fluid chamber, on rotation of the sleeve.

It is preferable that the cross-section, size and shape of projecting means 30 substantially conform to the cross-section, size and shape of channel means 7, except that the projecting means should be slightly larger. If the cross-section of means 7 is semi-circular, then projecting means 30 is preferably spherical in shape, and sized so that its hemispherical section is slightly larger than the cross-section of channel means 7. Projection means 30 is most preferably a ball disposed in a ball seat 31 (see FIG. 1) incised into the outer surface 25 of sleeve means 20. The ball seat 31 is dimensioned to extend a hemispherical portion of the ball 30 beyond the surface 25, with that portion itself being dimensioned to mate in a sealing relationship with the channel means 7 of body 1.

To retain ball projecting means 30 in ball seat 31, retaining means 32, 33 are provided. Means 32, 33 each have a face 32a, 33a, respectively, configured to substantially match and mate with the surface of ball 30. Means 32, 33 are narrower than the cross-section of channel means 7 and ball 30, thereby preserving the sealing relationship between the projecting hemispherical portion of the ball and channel means 7. Retaining means 32, 33 are in turn fastened to the surface 25 of sleeve means 20 by pins 34, 35.

In a particularly preferred embodiment, ball projecting means 30 is composed of a deformable elastomeric material. When constructed of this material, the ball will deform slightly during assembly of the device to provide the force necessary to seal its surface against the surface of channel means 7. Retaining means 32, 33 are most preferably formed of a polymeric material sold under the tradenames Celcon (Celanese) and/or Delrin (DuPont), which are acetyl homopolymer or copolymer materials.

The preferred apparatus of the invention includes an adjustable orifice means 50 (FIGS. 2, 3), which both establishes and enables adjustment of orifice 100 and provides passage means 200 by which fluid can be introduced into the fluid chamber formed by the coaction of channel means 7 and outer surface 25 of sleeve means 20. A substantially cylindrical main member 51 is threadingly engaged in a tapped bore 52 having a projecting shoulder portion 53 which extends outwardly from the outer surface of body means 1. Main member 51 is externally threaded in that portion of its length which lies within the projecting shoulder portion 53 of the tapped bore 52. The distal end of member 51 which projects into channel means 7 is unthreaded, as is the end of bore 52 which lies closest to said channel means 7. A thread relief 56 is provided at the end of the threaded portion of bore 52. The distal end of member 51 is provided with O-ring 201, which is seated in groove 202, to provide a sealing arrangement preventing fluid from leaking out of the fluid chamber along the outer surface of the adjustable orifice means.

Stop nut 54, which abuts and rests upon the end of projecting shoulder portion 53 of tapped bore 52, engages the threaded exterior of that portion of main member 51 which itself extends outwardly from the end of projecting shoulder portion 53 of tapped bore 52. Stop nut 54 is in turn provided with a set screw 55 which passes through its side wall, which is preferably an Allen head set screw requiring an Allen wrench for tightening and loosening.

In the preferred embodiments of the invention, the outermost end of main member 51 is fitted with a standard grease fitting 60, which is protected by a removable, internally threaded cover 61, which threadingly engages the external threads on member 51 Fitting 60 is affixed to the end of member 51, and aligns with central bore 200, which provides a fluid passage extending from the exterior of body 1 into channel means 7. Bore 200 ends at exit 210, which is preferably of a smaller diameter than the main portion of the bore. Exit 210 is disposed at the location of orifice 100, which is created between the distal end of main member 51 of means 50, and the oppositely disposed portion of the outer surface 25 of sleeve means 20.

Adjustment of the width of orifice 100, which is substantially rectangular in shape, is achieved by loosening set screw 55, loosening stop nut 54, and rotating main member 51 in either a clockwise (decreases the size of the orifice) or counterclockwise direction (increases the size of the orifice). Stop nut 54 is then tightened down against projecting shoulder portion 53 of tapped bore 54, and set screw 55 tightened, to lock and retain the distal end of main member 51 in the desired spacing from surface 25 of sleeve means 20.

Figure 5:
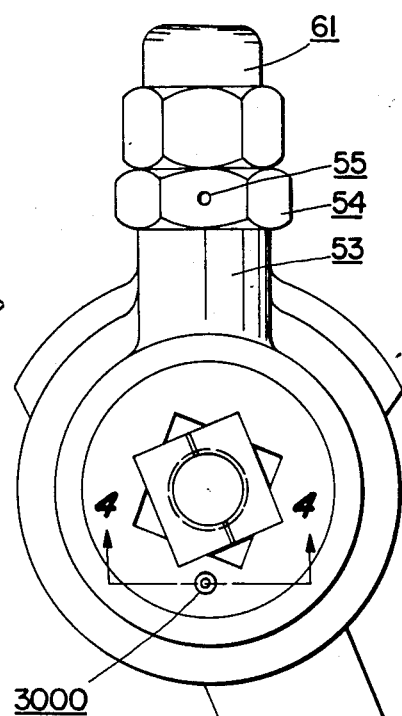
FIG. 5 is a top view of the first embodiment of the invention.

The valve connection means for effecting connection between sleeve means 20 and the valve in the valve means, which connection translates open and closed displacement of said valve to rotational movement of the sleeve about its longitudinal axis in the first preferred embodiment, and vice versa, is elongated valve stem 1000 (see FIG. 2). In a retrofitting application, an existing valve means may be disassembled in part and the original valve stem replaced by an elongated valve stem 1000. Valve stem 1000 is preferably square in cross section, and projects outwardly from the valve means. In normal order of assembly, a handle 2000 having a square or eight-pointed star-shaped bore is first placed over the end of valve stem 1000 and moved down that stem until it comes into contact with shoulder 1001 in stem 1000 (FIGS. 2, 5). Sleeve means 20 is provided with an internal passage extending longitudinally therethrough, 24, which is dimensioned to fit about the outer periphery of elongated valve stem 1000. Sleeve means 20 and its passageway 24 is positioned to align the stem 1000 with the passageway, and then manipulated to insert the stem into the sleeve means 20. Preferably, the stem 1000 is dimensioned to extend in length from shoulder 1001 to distal end 1002 which is equal to the combination of the thickness in cross section of handle 2000 (FIG. 2) and the length of sleeve means 20 between its faces 21, 22. The distal end of the stem 1000 is provided with a tapped bore 1005, into which externally threaded bolt 1006 with accompanying washer 1007 may be threaded to fasten sleeve means 20 into a combination with stem 1000 and handle 2000. Any rotation of valve stem 1000 about its longitudinal axis, driven by motion imparted to it by handle 2000, will result in rotation of sleeve means 20, which in turn will cause projecting means 30 to sweep through the volume of channel means 7. The device of the invention is attachable to valve stem 1000 after having itself been fully assembled, or may be assembled and attached simultaneously with the assembly of said valve.

Once mechanical assembly of the apparatus of the invention is complete, fluid must be provided to fill the fluid chamber formed between the channel means 7 and the outer surface 25 of sleeve means 20. Any viscous fluid may be used to fill the fluid chamber, provided that it is of a viscosity sufficient to provide resistance to movement of handle 2000 and, in turn, valve stem 1000, to prevent too-rapid closing of the valve actuated by stem 1000. More preferably, the fluid is a material, such as a petroleum or silicon grease, which demonstrates a non-Newtonian shear/stress response. A material which acts as a dilatant when subjected to shear is preferred. Ideally, a fluid that demonstrated a zero resistance up to a certain limiting handle speed, then, an infinite resistance with increased handle speed after that limiting speed is attained, is desired for the apparatus. Optimally, the fluid used is characterized by an initial low stress in response to applied shear, a substantial discontinuity or variation in shear/stress response at a selected shear, and thereafter a substantially higher stress in response to shear, with increase in shear. Currently available fluids may be used which do not satisfy these optimal characteristics, however.

Figure 4:
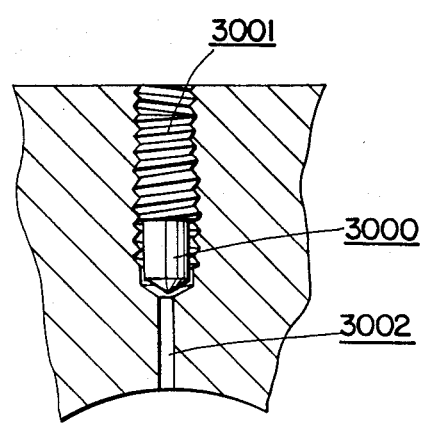
FIG. 4 is an expanded front cross sectional view of a portion of the first embodiment of the apparatus of the invention, taken along section line 4—4 of FIG. 5.

The fluid, such as a silicon grease, is supplied to the fluid chamber by the use of a delivery device which has means compatible with fitting 60. Fitting cover 61 is removed, and the hose of an appropriate grease delivery device is attached to fitting 60. Silicon grease is delivered into and through fitting 60, into passageway 200 and out of opening 210 into the fluid chamber. To provide for the escape of entrapped air, which insures a complete filling of the fluid chamber, bleed screw 3000 is provided (FIGS. 4, 5). Bleed screw 3000 is borne in threaded bore 3001, which communicates with ball seat 31 (FIG. 1) via passage 3002 in a direction perpendicular to the plane of FIG. 1. When filling begins, the screw is backed away from its seat over passage 3002 to provide an open air passage through passage 3002 and bore 3001 to the exterior of the device. Fluid is supplied to the fluid chamber until a small quantity escapes through the passage 3002 and bore 3001. The bleed screw 3000 is then re-seated against its stop over passage 3002 to prevent further leakage of fluid or introduction of air into the fluid chamber.

An additional adjustment of orifice 100 should then be made if the prior adjustment requires variation or if an initial adjustment is necessary after a first filling of a new device. Set screw 55 is loosened, and stop nut 54 backed off. Rotation of main member 51 is then effected to enlarge or lessen the size of the orifice. The geometry of the components of the apparatus of the invention enable a ready correlation between the number of turns of main member 51 and the lateral distance between the distal end of that element and the opposing surface 25 of sleeve means 20. Once the adjustment has been made, stop nut 54 is tightened down against projecting shoulder portion 53 and set screw 55 re-secured. Re-adjustment is easily accomplished at any time by repeating these steps. The range of selectable orifice sizes may be controlled by providing stops which coact with main member 51.

In the expected range of orifice sizes necessary to the optimal operation of the apparatus, main member 51 of adjustable orifice means 50 will extend well into channel means 7. On over-rotation of sleeve means 20 during assembly operations, projecting retaining means 32, 33, will contact and be stopped by said main member 51. It may be desirable to avoid the auxiliary use of retaining means 32, 33 as stops. The outer portions of body means 1 can be configured to provide stops which handle 200 will contact to prevent over-rotation of sleeve means 20 before either of retaining means 32, 33 contacts the main member of adjustment orifice means. After assembly, the standard stop means well known to those skilled in the art to be present in most valves will act to prevent any such over-rotation of sleeve means 20.

Resistance to the movement of handle 2000, and hence valve stem 1000, results from the sweeping of the volume of channel means 7 by the projecting means 30, driven by the rotation of sleeve means 20. Projecting means 30 forces the flow of fluid toward and through orifice 100, which resists that flow. When the travel of sleeve means 20 is reversed, when the valve position is varied through motion of stem 1000 driven by handle 2000, the projecting means will force the fluid through the orifice 100 in an opposite direction. Orifice 100 will again resist that flow, because no selectivity of resistance is provided by the preferred embodiments dependent upon the direction of handle 2000's movement. Any movement of handle 2000 and, in turn, valve stem 1000, is subjected to the resistance which the apparatus of the invention is designed to provide.

Basically, the projecting means 30 constitutes a piston and the fluid chamber bounded by channel means 7 and the oppositely disposed portions of surface 25 of sleeve means 20 constitutes a cylinder, the combination of which forces the fluid through orifice 100. The piston and cylinder function bi-directionally with the rotation of sleeve means 20.

A second preferred embodiment of the invention is illustrated in FIGS. 6-7, indicated generally as B. Its construction and operation is substantially identical to that of the first embodiment, illustrated in FIGS. 1-5, except for the specific valve connection means used to effect connection between the sleeve means 20 and the valve means. Valve stem 4000 is part of the overall valve means (not illustrated) and, in a fashion similar to valve stem 1000 (FIGS. 1-2), is in turn disposed to coact with the valve, such that opening and closing of the valve results from rotation of stem 4000 about its longitudinal axis. Preferably, stem 4000 is a square trunnion member, extending from the valve means. Handle 2001 has an eight-pointed star bore 2020, which contacts the four outer surfaces of stem 4000, but leaves four corners of that bore 2020 unoccupied, corners 2030a–d. Stem 4000 terminates flush with the outer surface 2003 of the bore-bearing portion of handle 2001. An internally threaded bore 2005 is disposed at the distal end of stem 4000.

Sleeve means 20 in the second preferred embodiment has a cylindrical, longitudinal bore 500. Projecting outwardly and rearwardly from face 22 of sleeve means 20 are four pins, 600a–d. These pins are disposed in a square arrangement with respect to each other in face 22, each borne in a passage means extending into the body of sleeve means 20. The configuration of pins 600a–d is identical to the location of unoccupied corners 2030a–d of bore 2020 of handle 2001, which allows the pins to be inserted into those corners as the apparatus of the invention is mated to the handle 2001 and valve means combination. Bolt 501 and washer 502 are then supplied to fasten the components of the combination together (FIG. 7), with the distal end of bolt 501 being externally threaded and threadingly engaged with internally threaded bore 2005 of valve stem 4000. The pins 600a–d, with bolt 501, prevent the apparatus of the invention from twisting off the valve means, and transmit any motion of handle 2001 into rotation of sleeve means 20, providing the desired resistance to rotation of valve stem 4000 and, in turn, the valve in said valve means.

Retrofitting of the second preferred embodiment to an existing valve with a square trunnion is very simple, because the only structural modification that might be required is the drilling and tapping of bore 2005 into the valve stem 4000. In many existing valves, a drilled and tapped bore 2005 will already be provided, however. Square trunnion valve stems are extremely common, and readily mate with the handle 2001 and pin 600a–d combination.

The preferred embodiments of the apparatus of the invention may be used with any type of valve means in which the opening and closing of the valve itself is the result of rotation of a member of the valve means which is accessible from the exterior, such as stems 1000 and 4000. Ball shutoff valves are an example of a valve means with which the apparatus of the invention is preferably usable. The apparatus is particularly useful where ball shutoff valves are combined in fluid flow apparatus with a wye, a siamese and/or a nozzle shutoff.

The combination of apparatus of the invention A with a wye structure 6000 is shown in FIGS. 8-9. Apparatus A is affixed to the trunion which actuates ball valve 6003 by externally thread bolt 1006 and washer 1007, and is driven by handle 2000. Wing fastening means 6001, having an internally threaded female passage 6005 secures the wye to appropriate upstream apparatus, such as a source of flowing fluid. Externally threaded male couplings 6004 a, b, located at the ends of the outwardly diverging members of wye 6000, provide means for attaching downstream fluid conveying means, having female coupling members, thereto, such a hose.

The configuration of a siamese is substantially identical to the configuration of wye 6000, save for the outward coupling means. In a siamese 7000, internally threaded female couplings are provided, one of which, coupling 7001a, is shown (FIG. 10). Coupling 7001a exists in the same relationship to the remaining siamese structure as coupling 6004a does to the remaining structure of wye 6000.

Apparatus A of the invention may also be combined with a ball shutoff valve device 8000 (FIGS. 11-12), which may be interposed between upstream and downstream fluid conveying means, such as hose segments, to control flow. Apparatus A is affixed to the trunion which actuates ball value (not shown) in such means, by externally threaded bolt 1006 and washer 1007, and is driven by handle 8000.

Apparatus A of the invention may also be combined with a nozzle incorporating a ball shutoff value (FIGS. 13-14). Nozzle 9000 is an adjustable nozzle of the type known to those of ordinary skill in the fluid flow art, particularly firefighting apparatus. Apparatus A is affixed to the trunion which actuates ball value 9002 (FIG. 14) by externally threaded bolt 1006 and washer 1007, and is driven by handle 9001 (shown in partial section).

While particular embodiments of the invention, and the best mode contemplated by the inventor for carrying out the invention, have been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

I claim:

1. Apparatus for minimizing water hammer and/or shock waves resulting from closure of a valve disposed for movement into and out of closing arrangement in valve means included within a fluid flow system, comprising
   a. Body means, having oppositely disposed first and second outer faces, wherein a substantially cylindrical internal passage extends longitudinally therethrough and between said faces, at least a part of the surface of said internal passage comprising at least one continuous channel means, disposed circumferentially along and within said surface, having a substantially constant cross section for the full circumference of the surface, extending uniformly into said body below said surface, such that said channel means generally defines a path laterally disposed to the longitudinal axis of said substantially cylindrical passage;
   b. sleeve means, having oppositely disposed first and second outer faces, and a continuous cylindrical outer surface rotatably disposed for rotation about its longitudinal axis within said substantially cylindrical internal passage in said body means, having an outer surface disposed towards and in bearing relationship with the surface of said internal passage, which outer surface in coaction with said continuous channel means of said body defines a closed, annular fluid chamber;
   c. projecting means extending outwardly from said outer surface of said sleeve means, configured to fit substantially within and continuously sealingly coact with said continuous channel means in said internal passage of said body means, whereby said projecting means sweeps the volume of said continuous channel means on rotation of said sleeve;
   d. adjustable orifice means, adjustably disposed in said body to extend inwardly from the exterior of said body into said internal passage and into said continuous channel means in said body, such that its distal end projects into said channel means, and arranged to adjustably coact with the continuous cylindrical outer surface of said sleeve means to form an orifice between the distal end of said orifice means and said outer surface;
   e. valve connection means for effecting connection between said sleeve means and said valve means, whereby displacement of the valve in said valve means results from rotational movement of said sleeve means about its longitudinal axis; and
   f. means for effecting externally applied rotational movement to said sleeve means.

2. The apparatus of claim 1 wherein said sleeve means further comprises a passage extending therethrough, and said valve connection means comprises a rotatable valve stem operably connected to said valve member which extends into said passage in said sleeve means.

3. The apparatus of claim 1 wherein said valve connection means comprises a plurality of outwardly projecting pin means, which extend from one of the outer faces of said sleeve means, disposed to rotatably engage said valve means whereby movement of said valve member results in rotation of said sleeve means.

4. The apparatus of claim 1 wherein said adjustable orifice means further includes fluid passage means therein extending from the exterior of said body into said channel means, whereby fluid may be supplied to said fluid chamber.

5. The apparatus of claim 1 wherein said projecting means comprise a ball disposed in a ball seat incised into the outer surface of said sleeve means, said ball seat being dimensioned to extend a hemispheric portion of said ball beyond said outer surface, said ball portion itself being dimensioned to mate in a sealing relationship with said channel means of said body.

6. The apparatus of claim 5 wherein said projecting means is retained in said ball seat by retaining means mounted on said outer surface of said sleeve means.

7. The apparatus of claim 5 wherein said ball is composed of deformable elastomeric material.

8. The apparatus of claim 1 wherein said adjustable orifice means bears outwardly disposed threaded means which mate with complimentary means in said body means, whereby said orifice is adjusted by rotation of said orifice means about its longitudinal axis.

9. The apparatus of claim 6 wherein said ball is composed of deformable elastomeric material.

10. The apparatus of claims 1, 2, 3, 4, 5, 6, 7, 8 or 9, wherein said valve means comprise a ball shutoff valve.

11. The apparatus of claims 1, 2, 3, 4, 5, 6, 7, 8 or 9, wherein said valve means comprises a ball shutoff valve, and said valve means is disposed in combination with a structure selected from the group consisting of a wye, a siamese and a nozzle shutoff.

12. The apparatus of claims 1, 2, 3, 4, 5, 6, 7, 8 or 9, wherein a fluid displaying a non-Newtonian shear/stress response is contained in said chamber.

13. The apparatus of claim 10, wherein a fluid displaying a non-Newtonian shear/stress response is contained in said chamber.

14. The apparatus of claim 11, wherein a fluid displaying a non-Newtonian shear/stress response is contained in said chamber.

15. The apparatus of claims 1, 2, 3, 4, 5, 6, 7, 8 or 9, wherein a fluid displaying a non-Newtonian shear/stress response, characterized by an initial low stress in response to shear, a substantial discontinuity in stress/shear response at a selected shear, and a substantially higher stress in response to shear, with increase in shear, is contained in said fluid chamber.

* * * * *